United States Patent [19]
Ginosar et al.

[11] Patent Number: 5,978,899
[45] Date of Patent: *Nov. 2, 1999

[54] APPARATUS AND METHOD FOR PARALLEL PROCESSING AND SELF-TIMED SERIAL MARKING OF VARIABLE LENGTH INSTRUCTIONS

[75] Inventors: Ran Ginosar, Nofit; Rakefet Kol, Haifa, both of Israel; Kenneth Scott Stevens, Hillsboro, Oreg.; Peter A. Beerel, Long Beach; Kenneth Yi Yun, San Diego, both of Calif.; Christopher John Myers, Salt Lake City, Utah; Shai Rotem, Beaverton, Oreg.

[73] Assignee: Intel Corporation, Santa Clara, Calif.

[ * ] Notice: This patent is subject to a terminal disclaimer.

[21] Appl. No.: 08/997,457
[22] Filed: Dec. 23, 1997
[51] Int. Cl.$^6$ ........................................................ G06F 9/30
[52] U.S. Cl. ........................ 712/210; 712/208; 712/209; 712/212; 712/200
[58] Field of Search ................................... 712/200–240, 712/40

[56] References Cited

U.S. PATENT DOCUMENTS

| | | | |
|---|---|---|---|
| 4,680,701 | 7/1987 | Cochran | 712/40 |
| 5,347,639 | 9/1994 | Rechtschaffen | 712/203 |
| 5,535,347 | 7/1996 | Grochowski | 712/204 |
| 5,553,276 | 9/1996 | Dean | 364/269 |
| 5,758,116 | 5/1998 | Lee | 712/210 |
| 5,870,599 | 2/1999 | Hinton | 712/239 |

Primary Examiner—Meng-Ai T. An
Assistant Examiner—Stacy Whitmore
Attorney, Agent, or Firm—Kenyon & Kenyon

[57] ABSTRACT

Optimal parallelization of necessarily serial operations is performed by speculative parallel processing and propagation of serial marking signals to indicate valid data. An exemplary instruction marking circuit for a computer system implementing such optimization includes a series of columns, each column corresponding to one byte of a fixed length instruction line, and a length decoder in each column. Each length decoder receives a byte of the respective column, and performs a length decode independently of the other length decoders. The length decoder asserts a length signal indicative of an instruction length when the byte is the first byte of an instruction. A marking unit arrangement is coupled to the length decoders, and operates to mark each column containing a first byte of an instruction as a function of the length signals asserted by the length decoders.

37 Claims, 10 Drawing Sheets

TOP-LEVEL BLOCK DIAGRAM

APPARATUS AND METHOD FOR PARALLEL PROCESSING AND SELF-TIMED SERIAL MARKING OF VARIABLE LENGTH INSTRUCTIONS

FIELD OF THE INVENTION

The present invention is directed to a process and system for parallelization of necessarily serial operations to increase performance of particular processing systems. More particularly, the present invention provides a process and system for increasing the performance of instruction decoding in a computer system by using an instruction decoding circuit having parallel length decoding and self-timed (asynchronous) length decoding, marking, and steering.

BACKGROUND INFORMATION

Computer systems are capable of executing various arithmetic and logic operations on data. The particular arithmetic or logic operation to be executed is indicated by an "instruction" that is typically retrieved from a memory of the computer system, decoded in an instruction decode block, and then transmitted to an execution block of the computer for execution. Computer programs comprise a set of instructions that, when taken from memory, decoded and transmitted to the execution block in a certain sequence, cause the computer system to execute a series of operations that achieve the objective of the program.

There are computer systems designed to implement a variable length instruction architecture, wherein instructions can vary in length from, for example, one byte to eleven bytes or more. However, memory systems, and in particular the cache memory used to store instructions prior to execution, typically store data in fixed sized blocks such as, for example, sixteen byte blocks. In such a system, instruction data is fetched in sixteen byte lines aligned on sixteen byte boundaries. Accordingly, in a variable length instruction architecture, each fixed sized line fetched from memory contains instructions of various lengths that may start anywhere within the line and may even cross a line boundary into a succeeding line of memory.

An instruction marking circuit is typically implemented in the instruction decode block of a computer having a variable length instruction architecture in order to mark the beginning of each instruction in a line fetched from a fixed sized line memory system. The instruction marking circuit includes length decoders, which process a selected byte or number of bytes of the fetched line to determine a length for the instruction containing the bytes. Once instruction lengths are determined and first instruction bytes are marked, the instructions of the fetched line can be transmitted to an instruction decoding circuit within the decode block.

Instruction marking is, by nature, a serial operation—the beginning of a particular instruction can be determined with certainty only after the beginning and length of a previous instruction have been determined. In present instruction marking circuits, the serial nature of instruction marking is accommodated by performing the marking operation according to an externally-timed scheme that controls and synchronizes circuit operations by a system clock. Marking information is propagated through the marking circuit in synchronization with the system clock. The length decoders that are typically used in marking circuits, however, comprise combinational logic circuits that perform length decodes in varying amounts of time depending upon the particular instruction being processed. To assure that all possible instructions found in an instruction line fetched from memory will be marked, the timing of the clock signals must be sufficient to process a "worst case" decode time for an instruction. That is, the timing must be sufficient to permit signals to traverse the longest path through the combinational logic of the length decoder, thus delaying the propagation of marking signals through the marking circuit when the instruction is not a "worst case" instruction.

Only a limited subset of instructions are of the "worst case" instruction type. Thus the time required for processing this relatively small subset of instructions is imposed on all marking operations such that the overall time needed for instruction marking is longer than actually required in most instances. As a result, the known scheme for marking instructions in a variable length instruction architecture incurs wasteful delay in the instruction execution process, decreasing system performance.

SUMMARY OF THE INVENTION

A circuit is provided as an embodiment of the present invention. The circuit comprises a number of parallel processing units each having at least one input and at least one output, as well as a number of serial processing units each coupled to an associated parallel processing unit via the at least one output and each coupled to at least one other serial processing unit. Each parallel processing unit processes, in parallel, input data received via the at least one input, and then generates output data based on the input data at the least one output. The output data of each parallel processing unit is determined to be valid if the serial processing unit associated with the parallel processing unit receives a marking signal from another serial processing unit.

The circuit according to the present invention can be specifically implemented as an instruction marking circuit. The instruction marking circuit according to the present invention comprises a plurality of length decoders, each of the length decoders having a length decoder input to receive a respective input byte and a length decoder output to transmit respective length data based on the input byte. The instruction marking circuit also comprises a plurality of marking units, each of the plurality of marking units coupled to a respective one of the plurality of length decoders to receive the respective length data. Each of the plurality of marking units is further coupled to at least one other marking unit in order to directly provide a marking signal to the at least one other marking unit.

DETAILED DESCRIPTION

Figure 1:
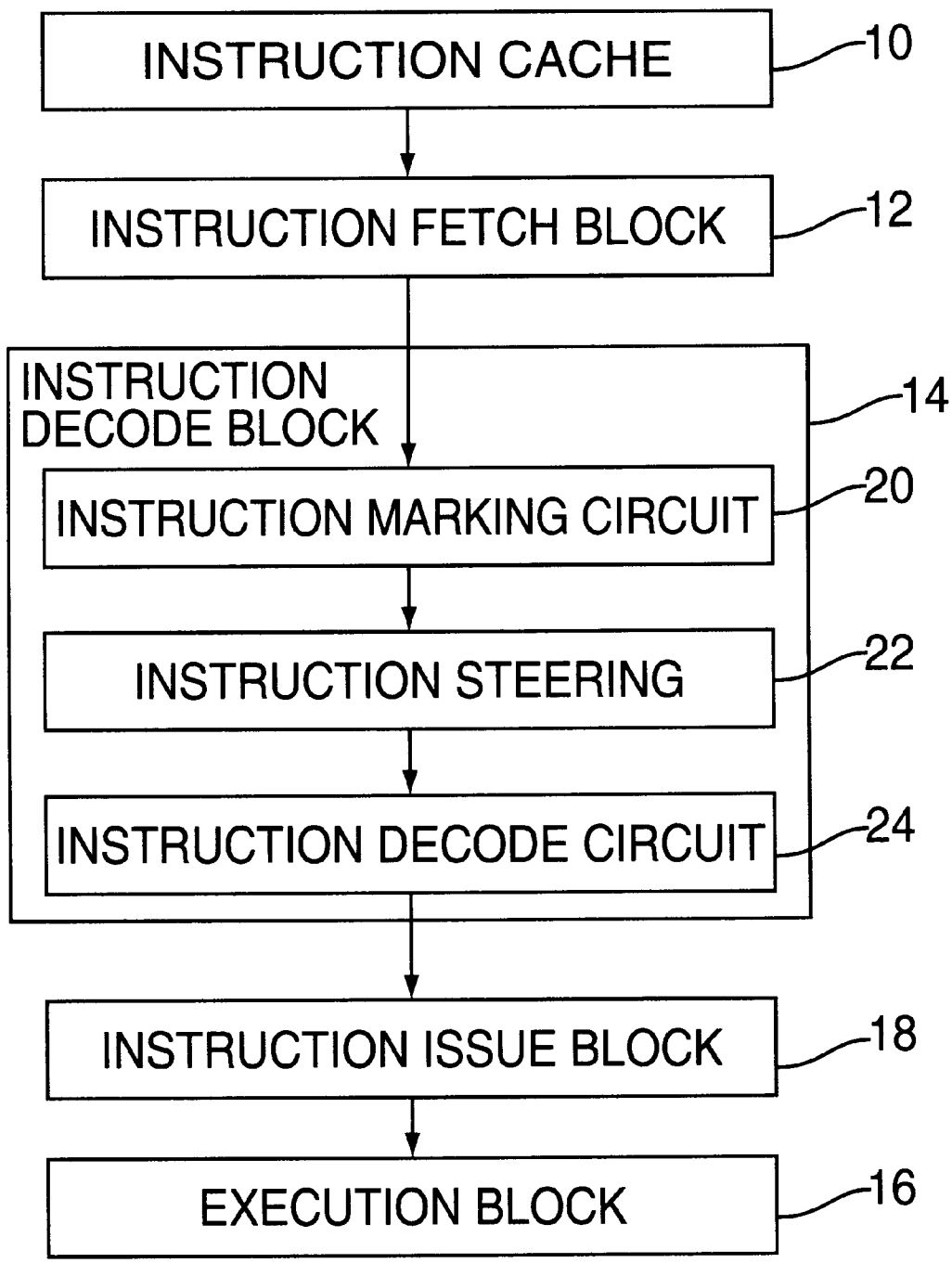
FIG. 1 is a block diagram of an instruction fetch, decode and execute pipeline of a computer system.

The present invention increases the processing speed of necessarily serial operations, i.e. those operations requiring information about past events in the system, by speculatively performing information processing in parallel units. The serial nature of the operation is accommodated using a self-timed marking process to indicate when the result of a particular parallel processing unit is valid. Although some processing units may be found to be invalid (and their results ignored), no delay is incurred, because this processing is in parallel with the processing of the processing unit found to be valid. Moreover, because the processing results of each processing unit are generally available as soon as the self-timed marking process marks a processing unit as containing valid information, a considerable increase in speed from the clock-synchronized process can be achieved.

The present invention is specifically useful as a fast instruction decoding system for a computer instruction handling system. For example, the invention can be implemented as a circuit for parallel self-timed length decoding, marking, and steering of instructions. In a first embodiment of the present invention, once an instruction line is fetched from the fixed line-size memory, each byte of the instruction line is separately input to a corresponding byte latch in a marking circuit and processed in one of several length decoders in the marking circuit. Each length decoder processes the respective byte, together with any additional bytes as may be required by the decoding algorithm used in the variable instruction length architecture to resolve the instruction length. Byte processing is performed as a parallel operation in each length decoder, and in a self-timed manner, i.e. as soon as the bytes needed for length decoding are available, the length decoder performs a decode resulting in an instruction length. No system clock is needed. The combinational logic implemented in the length decoder produces a signal indicating the computed length of the instruction, under the assumption that the byte being processed is the first byte of an instruction.

Each length decoder has length signal outputs to indicate the speculative length of the instruction (should the byte being processed be the first byte of an instruction). For example, this first embodiment uses a number of "one-hot" length signal outputs equal to the maximum number of bytes allowed for an instruction under the variable instruction length architecture, with each output corresponding to an instruction of a certain byte length. For example, in a variable length instruction architecture having instructions of from one to eleven bytes in length, each length decoder will have eleven outputs, one for a one byte instruction, one for a two byte instruction, and so on. The respective length decoder asserts a signal on the output corresponding to the length determination made by the length decoder for the current byte being processed. The length decoder asserts the appropriate signal as soon as it completes the length decode for the current byte. Thus the length decode signals may be available much earlier than the "worst-case" decode time.

In the first embodiment of the present invention, a plurality of marking units is also provided, one for each byte position in the instruction line and associated with a length decoder. Instruction length outputs of the associated length decoder are coupled to the marking unit, thus providing the marking unit with the instruction length determined by the length decoder. The marking unit includes a number of outputs used to mark a subsequent byte as the first byte of the next instruction. The number of outputs corresponds to the maximum number of bytes possible in the variable length instruction architecture. Thus, for a maximum instruction length of four bytes, each marking unit has four outputs, one corresponding to each byte length available in the variable length instruction architecture.

Based on the length signals provided by the length decoder, the marking unit determines the first byte of the next instruction (should the present byte be found to be the first byte of an instruction). The marking unit indicates the first byte of the next instruction by signaling the subsequent marking units via the marking outputs. This is achieved, for example, by a "one-hot" signal transmitted over the marking outputs to downstream marking units. The marking outputs are each directly coupled to a marking unit for a subsequent instruction line byte: the marking unit output used to signal a one byte length instruction is coupled to the marking unit for the next byte position of the instruction line; the marking unit output used to signal a two byte length instruction is coupled to the marking unit two byte positions away, and so on. Correspondingly, each marking unit also has a number of marking inputs corresponding to the maximum number of bytes possible in the variable length instruction architecture. These marking inputs correspond to the marking outputs produced by the previous marking units in the circuit.

According to the above connection scheme between marking units for byte positions, the marking unit will directly mark the byte position containing the first byte of the next instruction. This marking signal is not asserted, however, until it is determined that the present byte position contains the first byte of an instruction.

Self-timed activation of a marking output of each individual marking unit is controlled by satisfaction of certain conditions. For example, the marking unit needs to be informed that it is processing the first byte of an instruction. This can be achieved by receiving a marking signal from a previous marking unit in the circuit (mentioned above). Other conditions which may control activation of the marking output include receiving an indication that all bytes of the instruction are loaded into byte latches and available for transfer, and receiving an indication that an output buffer is available to receive the instruction bytes for later decoding and execution. Once the conditions have been satisfied, a marking event occurs, wherein the instruction bytes are transmitted from the byte latches to the instruction decode circuit via, for example, a steering circuit, and the byte latches are loaded with bytes from the next instruction line in the instruction cache. The marking signal is sent directly to the succeeding byte position containing the first byte of the next instruction. The marking unit at that byte position may then perform a similar marking and transfer operation.

For those marking units corresponding to the end of the instruction line, the marking outputs of each such marking unit that represent an instruction length that is greater than the number of remaining byte positions in the line are wrapped around to the marking units corresponding to the beginning of the line. The marking information transmitted via the wrap around outputs therefore marks the first byte of the first instruction in the next fetched line.

Thus, pursuant to the present invention, the generation and transmission of marking information flows through the marking units in a self-timed manner, and directly to the byte locations of marked instruction bytes. As length decoding is performed in parallel for each byte position, the instruction length data is available as soon as a marking signal arrives, resulting in a considerable increase in processing speed. Furthermore, because processing of the bytes of a next instruction line begins as soon as the individual byte latches that are processing previous instruction bytes become available, and because the marking signal wraps around to marking units in the front byte positions of the marking circuit, no delay is incurred across instruction line boundaries.

A second embodiment of an instruction decode block according to the present invention avoids a possible bottleneck at the steering circuit due to the increased speed of the instruction marking circuit. The marking circuit is implemented using multiple marking units in each byte position, each marking unit of the byte position belonging to a different "row." Marking signals are propagated through the marking circuit by sending the marking signals to the marking unit of the next highest row for the byte position to be marked. The steering circuit is implemented to mirror the marking circuit, so that the steering circuit contains a number of output buffers equal to the number of rows in the marking circuit. Instruction bytes are transferred to the output buffer of the same row as the marking unit that has processed those instruction bytes. Instructions are therefore incrementally spread across each output buffer, allowing the instruction decode circuit to fetch instructions in order from each output buffer.

As a result of the speculative parallel processing of instruction bytes in anticipation of self-timed marking signals, the throughput of the computer instruction handling system (e.g. a microprocessor) is greatly enhanced over synchronized instruction handling systems.

Referring now to the drawings, and initially to FIG. 1, there is illustrated a block diagram of an instruction fetch, decode and execute pipeline of a computer system. An instruction cache 10 is a memory used to store a set of instructions that are most likely required by the computer for execution in the near future, in accordance with known caching techniques. The instructions are stored in and fetched from the instruction cache 10 in instruction lines, each comprising a fixed sized block of bytes, for example, sixteen bytes. Each instruction line stored in the instruction cache 10 is aligned within the memory along a sixteen byte boundary. Each instruction contained in a line can vary in length from one byte to the maximum byte length used in the computer system and any particular line of instructions can contain instructions of any combination of byte lengths.

An instruction fetch block 12 operates to fetch a line of instructions for input to an instruction decode block 14. The instruction decode block 14 decodes the instructions within the line fetched from the instruction cache 10 for input to an execution block 16 for execution, as is generally known. An instruction issue block 18 can be implemented to receive decoded instructions from the instruction decode block 14 for transfer to the execution block 16.

As noted above, the instructions stored in the instruction cache 10 can vary in length and instructions of any combination of lengths can be found in any particular instruction line fetched from the instruction cache 10. Accordingly, the instruction decode block 14 includes an instruction marking circuit 20 that operates to mark the first byte of each instruction contained in a fetched line. Once marked, the instructions are transferred, for example, to an instruction steering circuit 22 to await transfer to an instruction decode circuit 24. The instruction decode circuit 24 decodes the instructions and outputs decoded instructions to the instruction issue block 18.

An implementation of the present invention is as part of a microprocessor integrated circuit device, although the functionality of the present invention can be implemented as multiple integrated circuits (e.g., a "chip set") within a computer system.

The present invention will now be explained with reference to a first embodiment of an instruction decode block. The first embodiment of the present invention is implemented in a computer system where instruction lines are sixteen bytes wide, and instructions may vary in length from one to four bytes. The present invention is equally applicable to computer systems having wider or narrower instruction lines and longer or shorter instruction lengths, as those with skill in the art will recognize from the description given below.

Figure 2:
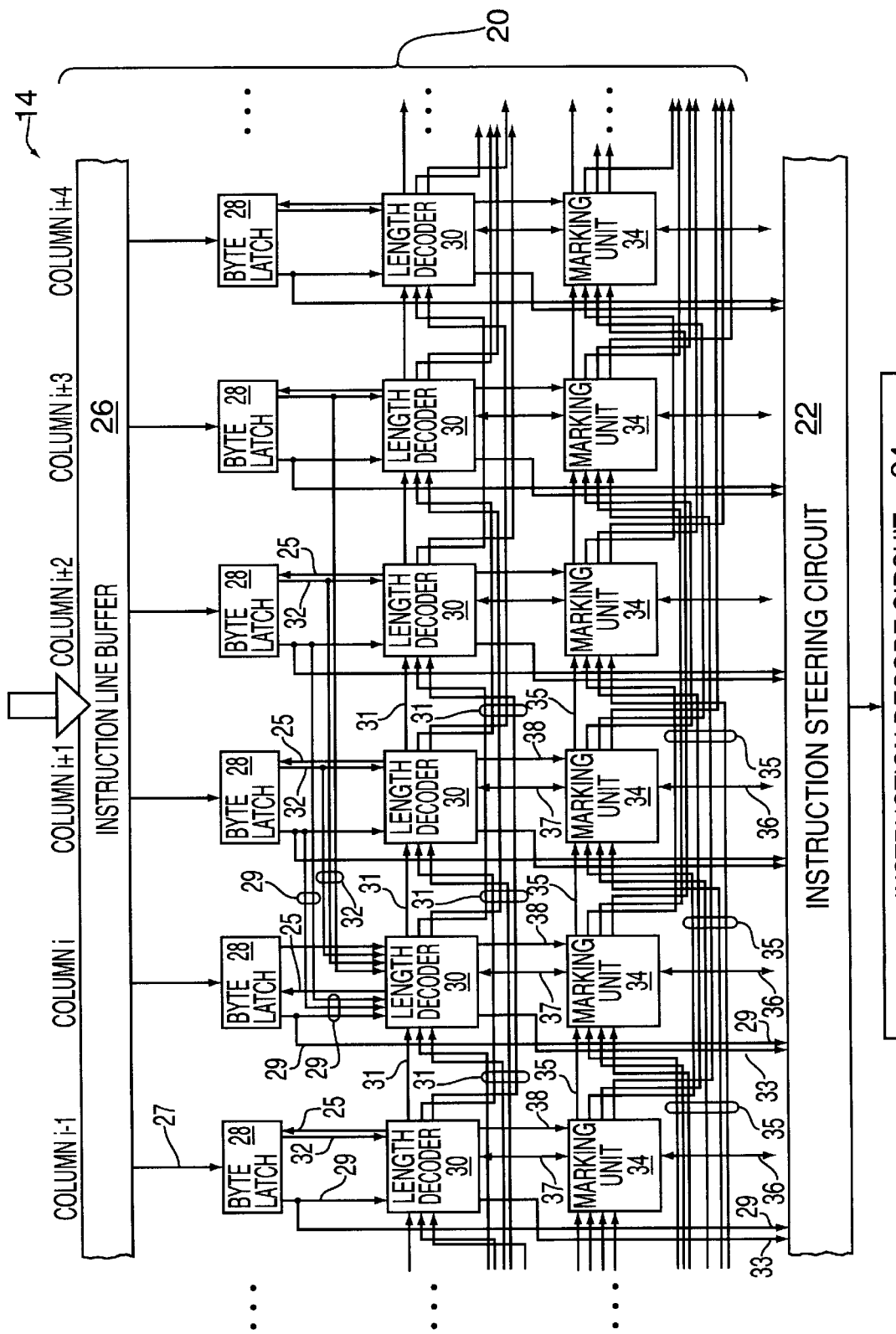
FIG. 2 is a block diagram of an embodiment of an instruction marking circuit according to the present invention.

The first embodiment of an instruction decode block 14 according to the present invention is shown by the block diagram in FIG. 2. FIG. 2 includes a block diagram of an embodiment of an instruction marking circuit 20 as used in the first embodiment of the present invention, showing the specific interconnections between function blocks. For ease of description, the instruction marking unit 20 is labeled by "columns," one column corresponding to each byte position across the width of the instruction line. For an instruction line width of "n" bytes, the instruction marking circuit 20 consists of n columns, beginning with column 0 at the "front" of the circuit and ending with column n−1 at the "end" of the circuit. In the embodiment of a sixteen byte instruction line, there are a total of sixteen columns: column 0 through column 15. As will be described further below, each column of the instruction marking circuit 20 is a collection of functional units for processing individual instruction bytes provided to the circuit.

FIG. 2 illustrates a segment of the instruction marking circuit 20, showing six of the columns, labeled columns i−1, i, i+1, i+2, i+3 and i+4. These generic column designations describe any series of six columns within instruction marking circuit 20 (e.g columns 3–8, 7–12, etc.), including those series of columns that "wrap around" from the end of the circuit to the front of the circuit (e.g. columns 14, 15, 0, 1, 2, and 3), as further described below.

Instruction marking circuit 20 includes an instruction line buffer 26, which receives a fetched instruction line from the instruction fetch block 12. Instruction line buffer 26 is the same byte width as the instruction line, and therefore "spans across" all columns of the instruction marking circuit 20, as illustrated in FIG. 2. Instruction line buffer 26 may be configured to store multiple fetched instruction lines by implementing a FIFO buffer structure at each byte location. This will also allow individual bytes to be processed by the marking circuit without waiting for processing of the entire instruction line to be completed.

A byte latch 28 is provided for each column of the instruction marking circuit 20. The byte latches 28 are coupled to the instruction line buffer 26 via byte latch input lines 27, such that the individual bytes of the fetched line are each latched into a respective one of the byte latches 28 when each respective byte latch 28 is directed to receive a byte. Each byte latch 28 is further coupled via byte latch output lines 29 to instruction steering circuit 22, so that instruction bytes can be transmitted to instruction steering circuit 22, as directed by the marking process.

Each byte latch 28 is also coupled to a length decoder 30 via the byte latch output lines 29, so that the byte stored in the respective byte latch 28 may be received by the length decoder 30. Each length decoder 30 may also be coupled to one or more downstream byte latches 28 so that the bytes from these latches may be used by length decoder 30 in instruction length decoding, as may be required by a length decode algorithm of the length decoder 30. In the first embodiment of the present invention, three bytes are used to decode the length of an instruction. Therefore, as shown in FIG. 2, length decoder 30 for column i is coupled to the byte latches 28 of columns i, i+1 and i+2 in order to receive the bytes stored in those three latches. This coupling arrangement applies in the same manner for all columns of instruction marking circuit 20 (for clarity, only coupling of byte latches 28 of columns i, i+1 and i+2 to column i is shown in FIG. 2).

Each byte latch 28 is further coupled to these length decoders 30 by ready lines 32, and ready acknowledge lines 25. As further described below, the ready lines 32 carry signals to indicate that the byte in the byte latch 28 is available to be processed. The ready acknowledge lines 25 carry signals to indicate that the byte in the byte latch 28 has been transmitted to the instruction steering circuit 22, and should be reloaded with a new byte.

Each length decoder 30 is further coupled to subsequent and preceding length decoders 30 via select lines 31. As further described below, the select lines 31 carry signals to indicate to subsequent columns that the byte being processed by the subsequent column is actually part of an instruction starting earlier, and not the first byte of a new instruction. The number of select lines 31 used for each length decoder 30 is one less than the maximum number of bytes possible for an instruction, and each individual select line 31 is coupled to a different downstream length decoder 30. For example, as shown by FIG. 2, the length decoder 30 of column i is coupled to the length decoders 30 in each of the subsequent three columns (columns i+1, i+2, and i+3) by a SELECT_i+1 line, a SELECT_i+2 line, and a SELECT_i+3 line, respectively. Accordingly, each length decoder is also coupled to preceding length decoders 30 via select lines 31. Thus, the length decoder 30 of column i is also coupled to the length decoders 30 of each of columns i–1, i–2 (not shown), and i–3 (not shown) by a respective select line 31: SELECT_i+1 from column i–1, SELECT_i+2 from column i–2, and SELECT_i+3 from column i–3.

Each length decoder 30 is further coupled to a marking unit 34 by length signal lines 38. As is described in further detail below, these length signal lines 38 carry signals to the marking unit 34 indicating the length of the instruction, as determined by the length decoder 30. In this first embodiment, the length signal lines 38 between each length decoder 30 and the respective marking unit 34 comprise n lines, with n being equal to the maximum number of bytes for an instruction. Thus, for the four byte maximum instruction length used in this first embodiment of the present invention, the length signal lines 38 comprise four lines: a LENGTH4 line, a LENGTH3 line, a LENGTH2 line, and a LENGTH1 line. Other configurations of length signal lines 38 can be used, depending upon the encoding scheme used for the length signals, according to known circuit design principles.

Each length decoder 30 is further coupled to the respective marking unit 34 by, for example, length decoder handshaking lines 37. The length decoder handshaking lines 37 may take several forms, depending upon the particular handshaking scheme implemented in the circuit. In the case of the first embodiment, length decoder handshaking lines 37 include an instruction ready line and an instruction ready acknowledge line. As is further described below, the instruction ready line carries an INSTRUCTION_READY signal generated by the length decoder 30 to indicate when an instruction is ready for transmission to the instruction steering circuit 22, while the instruction ready acknowledge line carries an INSTRUCTION_READY_ACKNOWLEDGE signal generated by the marking unit 34 to indicate that the byte has been transmitted to the instruction steering circuit 22.

Each length decoder 30 is also coupled to the instruction steering circuit 22 via length data lines 33. As is further described below, the length data lines 33 carry the length data to be transmitted to the output buffer indicating the instruction length.

Each marking unit 34 is coupled to one another by marking lines 35. The number of marking lines 35 used is dependent on the particular encoding scheme used to implement the marking process. In the first embodiment, a "one hot" encoding scheme is used (described below), so that the marking lines 35 originating at each marking unit 34 comprise n lines, with n equal to the maximum number of bytes per instruction. The marking lines 35 originating at each marking unit 34 are arranged such that each one of the marking lines 35 is coupled to the marking units 34 in each of the successive columns, up to the maximum length of the instruction. In the first embodiment of the present invention, four marking lines 35 originate from marking unit 34 of column i: a MARK_i+1 line, a MARK_i+2 line, a MARK_i+3 line, and a MARK_i+4 line. The marking unit 34 of column i is coupled to the marking unit 34 of column i+1 by the MARK_i+1 line, to the marking unit 34 of column i+2 by the MARK_i+2 line, to the marking unit 34 of column i+3 by the MARK_i+3 line, and to the marking unit 34 of column i+4 by the MARK_i+4 line. This example is repeated for the marking units 34 of each of the columns of the instruction marking circuit 20, so that the marking lines 35 originating at the marking unit 34 of each column are coupled to the marking units 34 of the next four higher columns. This arrangement of marking lines 35 permits each marking unit 34 to directly send a marking signal to a marking unit 34 in a subsequent column in order to mark that column as containing a first byte of a next instruction, as is further described below.

Each marking unit 34 is further coupled to instruction steering circuit 22 by buffer handshaking lines 36. These buffer handshaking lines 36 can be implemented in various ways in order to indicate the availability of the steering circuit to receive data. The first embodiment of the present invention uses as buffer handshaking lines 36 a buffer available line and a buffer request line. As is further described below, the buffer available line is used to carry a BUFFER_AVAILABLE signal generated by the instruction steering circuit 22 to indicate that the instruction steering circuit 22 is ready to receive another instruction, while the buffer request line is used to carry a BUFFER_REQUEST signal generated by the marking unit 34 to transfer an instruction to the instruction steering circuit 22.

Figure 3:
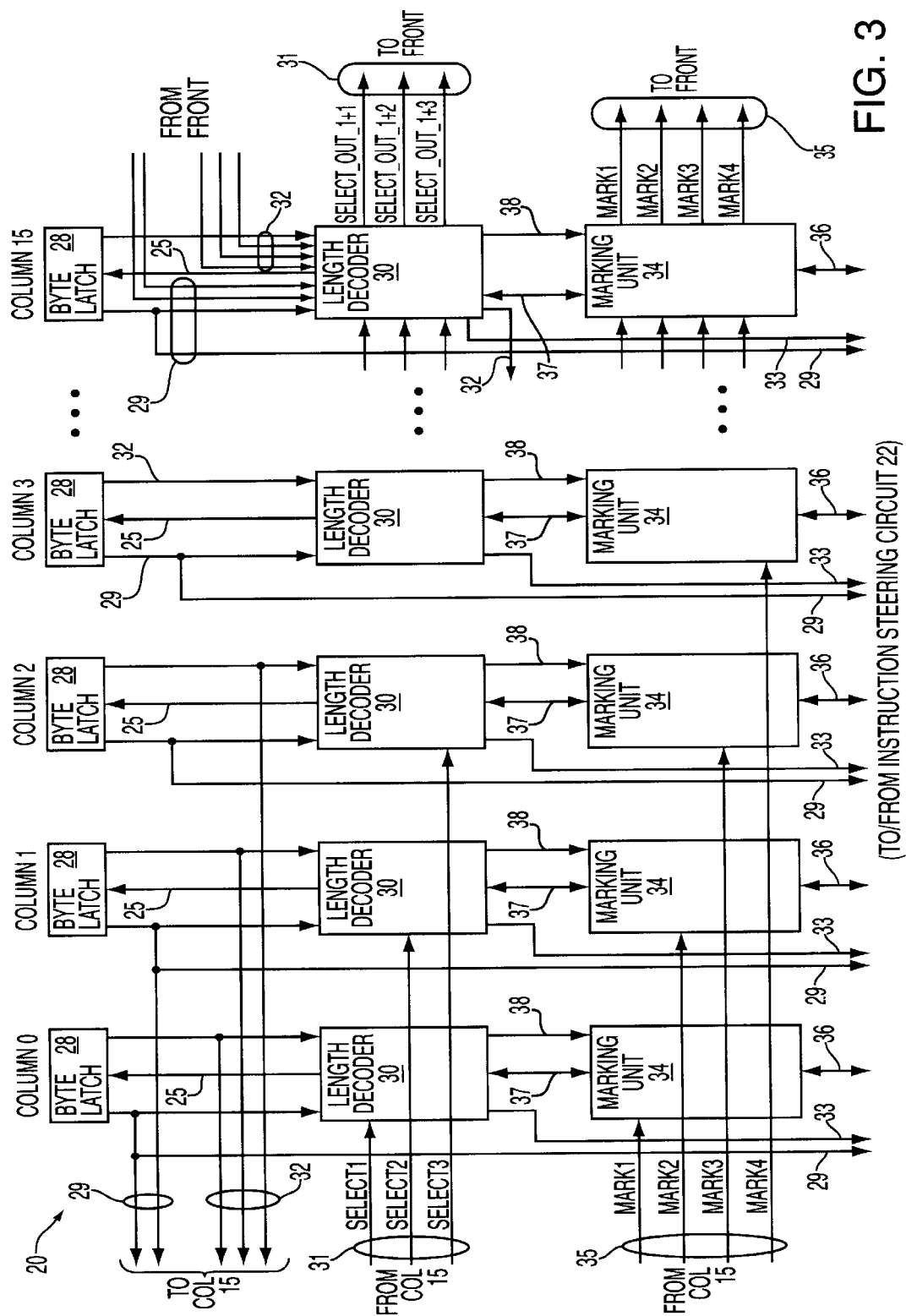
FIG. 3 is a block diagram of a "wrap around" feature of the instruction marking circuit according to the present invention.

In order to accomplish continuous serial marking of instructions and anticipatory length decoding, in those columns at the front or end of the instruction marking circuit 20 each of the coupling lines described above are "wrapped around" to the columns at the end and front of the circuit, respectively. Thus, referring to FIG. 2, if column i is assumed to be the last column of instruction marking circuit 20, columns i+1, i+2, i+3, and i+4 will correspond to the first four columns of instruction marking circuit 20. This wrap around feature of the present invention is further illustrated by FIG. 3, which partially depicts the interconnections between columns 0, 1, 2, 3, and 15 of the instruction marking circuit 20. As shown in this figure, the length decoder 30 of column 15 is coupled (via the byte latch output lines 29) to the byte latch 28 of column 15, and to the byte latches 28 of column 0 and column 1, thus providing the length decoder 30 of column 15 with the bytes needed for the decoding process. The ready signal lines 32 from the byte latches 28 of columns 0, 1 and 2 are also provided to the length decoder 30 of column 15.

Similarly, the select lines 31 originating from the length decoder 30 of column 15 are coupled to the length decoders 30 of column 0, column 1, and column 2, and the marking lines 35 originating at the marking unit 34 of column 15 are coupled to the marking units 34 of column 0, column 1, column 2, and column 3. By interconnecting the instruction marking circuit 20 in this manner, signals propagated through the circuit for a present instruction line may be applied to the bytes of a subsequent instruction line loaded into byte latches 28.

Figure 4:
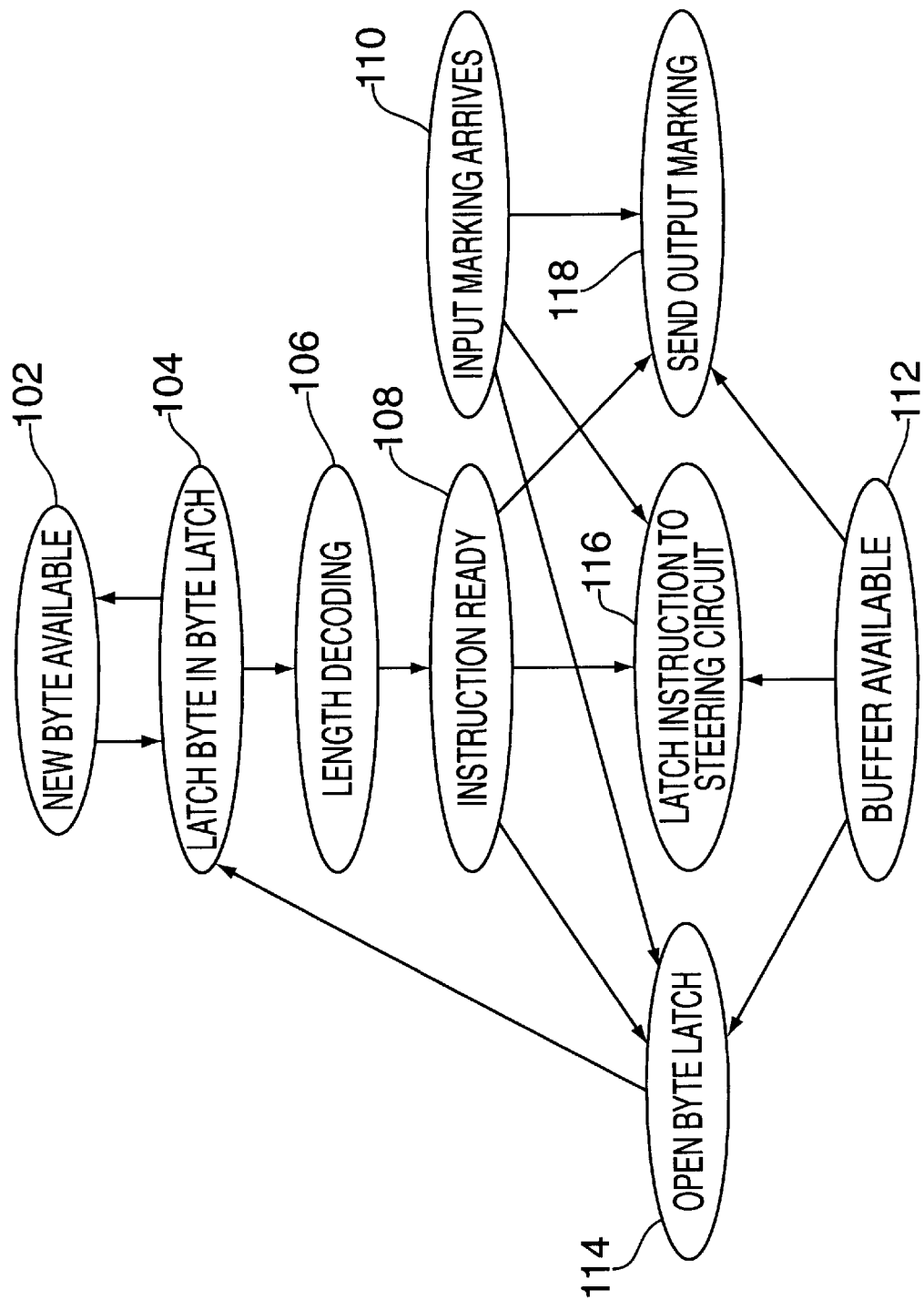
FIG. 4 is an event flow diagram of an embodiment of an instruction length decoding and marking process according to the present invention.

An embodiment of an instruction length decoding and marking process using the first embodiment of the present invention will now be explained, with reference to an event flow diagram for a single column—column i—of the instruction marking circuit 20, as shown in FIG. 4. The instruction length decoding and marking process begins with an instruction line being loaded into the instruction line buffer 26 and made available to the byte latch 28 of column i (event 102). When it is determined (via control signals explained in more detail below) that the byte latch 28 for column i is ready to receive another byte of data, an instruction byte is latched into the byte latch 28 of column i, as represented by event 104.

Once a byte has been latched into the byte latch 28 of column i, length decoding occurs in the length decoder 30 of column i, as signified by event 106. The actual length decoding algorithm used by length decoder 30 can be, for example, a known length decoding algorithm which generates an instruction length from provided bytes. The length decoder 30 performs an instruction length decode using the present byte and any downstream bytes as may be required by the particular decoding algorithm used, under the assumption that the present byte is the first byte of a present instruction. If downstream bytes are required for length decoding, length decoder 30 waits for these bytes to be latched into the respective byte latches 28 of respective downstream columns.

Length decoder 30 of column i performs length decoding independently of the length decoders 30 of other columns, and develops its respective output signals in a self-timed manner according to combinational logic within the length decoder 30. Once the length decoder 30 of column i has completed length decoding and has received an indication that all bytes of the instruction have been latched into their respective byte latches 28, the length decoder 30 communicates to the marking unit 34 of column i the length of that instruction and that an instruction is ready to be transmitted (event 108).

Two events that also occur in the instruction marking process occur independently of the length decoding process as described above. The first event is the receipt by the marking unit 34 of column i of a marking signal from an upstream marking unit indicating that the present byte has been marked as the first byte of an instruction (event 110).

The second event is the receipt by the marking unit 34 of column i of a signal from the instruction steering circuit 22 that the instruction steering circuit 22 is available for transmission of the next instruction to the instruction decode circuit 24 (event 112).

Once the events 108, 110, and 112 have occurred, three events are triggered simultaneously. First, the instruction steering circuit 22 is activated to latch the data from the appropriate byte latches 28 and the length data from the length decoder 30 to the instruction steering circuit 22 (event 116). Second, the column containing the first byte of the next instruction is marked by having the marking unit 34 of column i communicate a marking signal directly to the marking unit 34 of the column to be marked (event 118). If the first byte of the next instruction is in the next instruction line, the marking communication is wrapped around to the appropriate marking unit 34 at the front of the instruction marking circuit 20. Third, the byte latches 28 containing the bytes of the instruction transmitted to instruction steering circuit 22 are opened, making these byte latches 28 available to receive new data from the instruction line buffer 26 (event 114), and thus restarting the instruction length decoding and marking process for column i, as well as for those subsequent columns containing bytes of the transmitted instruction. The instruction length decoding and marking process is thus self-timed and self-resetting, providing length decoded instructions to the instruction decode circuit 24 as quickly as possible.

Figure 5:
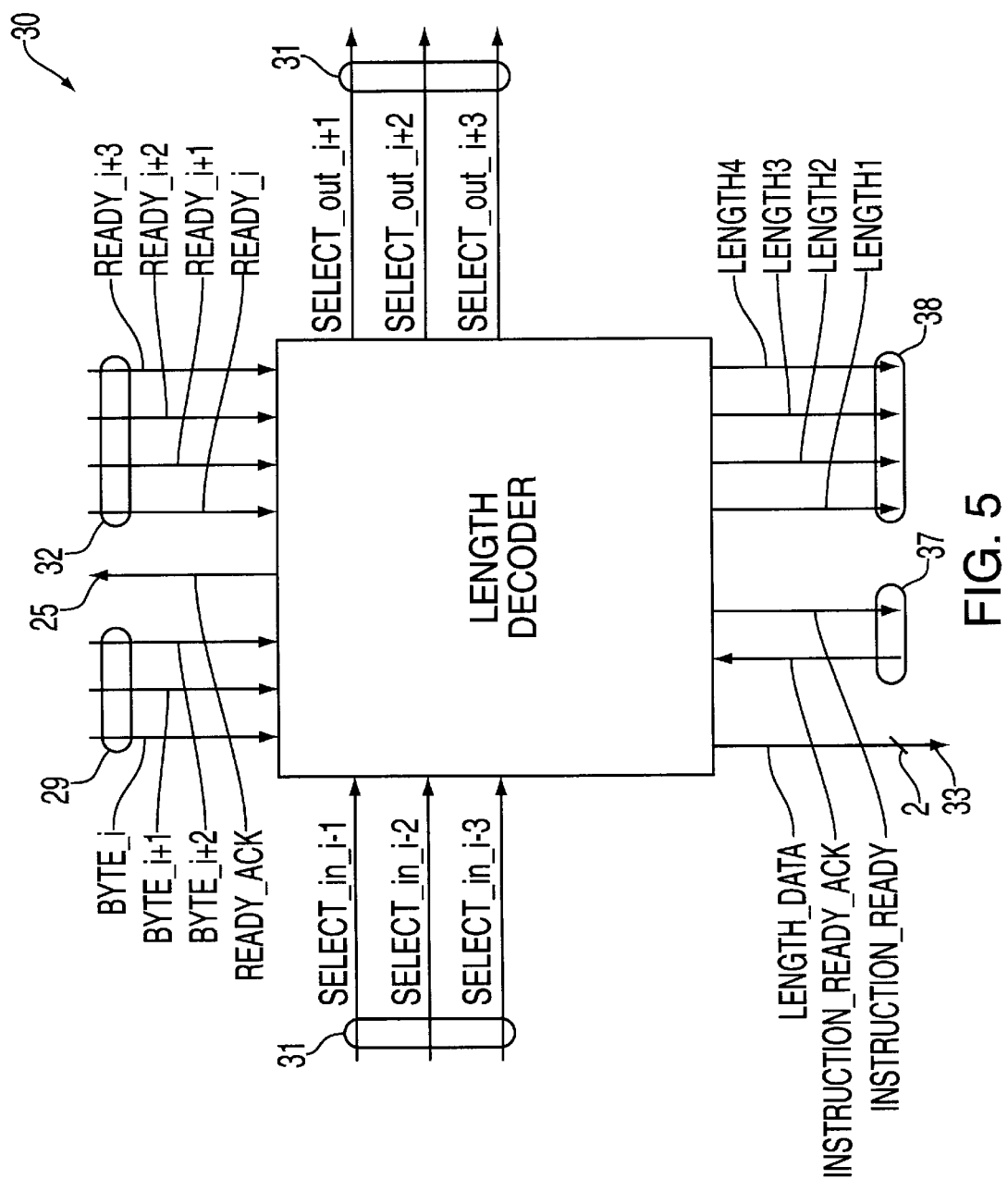
FIG. 5 is a block diagram of signal interconnections to an embodiment of a length decoder of the circuit of FIG. 2, according to the present invention.

FIG. 5 shows a detailed view of the interconnections to length decoder 30 as implemented in instruction marking circuit 20. Length decoder 30 receives as inputs instruction byte data from the byte latch 28 of column i and the byte latches 28 of subsequent columns as needed to perform length decoding. For the first embodiment of the present invention, three bytes are provided to length decoder 30: BYTE_i, BYTE_i+1 and BYTE_i+2.

Length decoder 30 of column i also receives the ready signals from the byte latches 28 of column i and the subsequent columns according to the maximum instruction length. For example, for the first embodiment having a maximum instruction length of four, the ready signal from columns i to i+3 are provided via ready signal lines 32: READY_i, READY_i+1, READY_i+2 and READY_i+3. These ready signals are generated, for example, by each byte latch 28 when a byte has been successfully latched by that byte latch 28.

Once the ready signal for BYTE_i has been received, the length decoder 30 begins length decoding according to combinational logic implemented within the length decoder 30 to perform the decoding algorithm. This combinational logic can take the form of, for example, sum-of-products configurations, and can be implemented using, for example, monotonic domino logic switching, according to circuit designs known to those skilled in the art. The combinational logic may further be implemented to optimize decoding for particular instruction types or lengths, as desired. The bits of BYTE_i are provided to the combinational logic within length decoder 30 to compute the instruction length. If the length decoder 30 determines, based on the decode of BYTE_i, that the instruction length decode requires the use of BYTE_i+1, this byte is then used by the decode logic once READY_i+1 is asserted. Likewise if it is determined that BYTE_i+2 is needed, this byte is also used by the decode logic once READY_i+2 is asserted.

Length decoder 30 produces length signal outputs and length data outputs at the completion of length decoding.

The length signal outputs (LENGTH1, LENGTH2, LENGTH3, and LENGTH4) are implemented, for example, as "one-hot" signals representing the length of the instruction, i.e., only one of the outputs LENGTH1, LENGTH2, LENGTH3, or LENGTH4 is active at any time. The length data outputs are data signals representing the length of the instruction, implemented, for example, as a standard binary code. The number of length data outputs is dependent on the maximum number of bytes per instruction. The first exemplary embodiment of the present invention employs two length data outputs. The length decoder 30 is coupled to the length data lines 33 and the length signal lines 38 such that the length data output by the length decoder 30 is carried by the length data lines 33, and the "one-hot" length signals output by the length decoder 30 are carried by the appropriate length signal lines 38. Prior to the completion of length decoding, the outputs LENGTH1, LENGTH2, LENGTH3, and LENGTH4 are all deasserted, indicating that the length decoding process has not been completed.

Once one of the "one-hot" length signals has been generated by length decoder 30, (and once the ready signals from the byte latches 28 containing the bytes of the instruction have been asserted) the INSTRUCTION_READY signal is generated by length decoder 30 to indicate to the marking unit 34 that all bytes of the instruction are ready to be latched. Generation of the INSTRUCTION_READY signal can be done using known circuit designs. In the first embodiment of the present invention, the INSTRUCTION_READY signal may be represented by the following logic equation:

```
INSTRUCTION_READY =
    LENGTH1·READY_i +
    LENGTH2·READY_i·READY_i+1 +
    LENGTH3·READY_i·READY_i+1·READY_i+2 +
    LENGTH4·READY_i·READY_i+1·READY_i+2·READY_i+3
```

If the marking unit 34 has determined that the byte being processed by column i is the first byte of an instruction and that the instruction steering circuit 22 is ready for transmission of the instruction bytes (as described in detail below), marking unit 34 asserts the INSTRUCTION_READY_ACKNOWLEDGE signal as a pulse. The asserted INSTRUCTION_READY_ACKNOWLEDGE signal is used to reset the length decoding logic for the next byte to be processed by column i, and to generate the ready acknowledge and select signals (as described below). The above decoding process is then repeated for the new instruction byte in byte latch 28.

If the instruction being processed in column i is determined to be longer than one byte, indication is sent to downstream columns that the bytes being processed by those columns are actually part of an instruction. In the first embodiment of the present invention, this is accomplished by asserting a select signal via the select lines 31. For example, a SELECT_out_i+1, SELECT_out_i+2 and SELECT_out_i+3 signal will be asserted on the appropriate select lines 31. Generation of the select signals can be done using known circuit designs. In the first embodiment of the present invention, the select signal may be represented by the following logic equations:

```
SELECT_out_i+1 = INSTRUCTION_READY_ACKNOWLEDGE·
                 (LENGTH2+LENGTH3+LENGTH4)
SELECT_out_i+2 = INSTRUCTION_READY_ACKNOWLEDGE·
                 (LENGTH3+LENGTH4)
SELECT_out_i+3 = INSTRUCTION_READY_ACKNOWLEDGE·
                 (LENGTH4)
```

According to the above equations, a select signal is generated once the marking unit 34 of column i has acknowledged that the byte being processed by column i is the first byte on an instruction (via the INSTRUCTION_READY_ACKNOWLEDGE signal). The select signals that are generated are dependent on the length of instruction (as indicated by the length signals). Thus, for example, if a three byte instruction has been signaled (by an asserted LENGTH3 signal), the SELECT_out_i+1 and SELECT_out_i+2 signals will be asserted when the INSTRUCTION_READY_ACKNOWLEDGE signal is received from marking unit 34. Since the INSTRUCTION_READY_ACKNOWLEDGE signal is a pulse, the select signals will likewise be asserted for only a short duration.

As shown in FIG. 5, length decoder 30 also receives select signals from upstream columns of the instruction marking circuit 20. These signals are shown in FIG. 5 as SELECT_in_i-1, SELECT_in_i-2 and SELECT_in_i-3 signals. Receipt of any select signal causes the length decoder 30 to reset the length decoding circuits to prepare for processing the next byte in the column and to cause the byte latch 28 of column i to reload (described below). As the select signals are pulsed, the length decoder 30 may contain a state machine element to "remember" the select signal until reset can be achieved.

Length decoder 30 asserts a ready acknowledge signal (READY_ACK) via ready acknowledge line 25 to indicate that the byte in column i has been transmitted to the instruction steering circuit 22, and therefore a new byte should be latched into byte latch 28 of column i. For example, the READY_ACK signal is asserted in the first embodiment if column i contains the first byte of a marked instruction (indicated by the INSTRUCTION_READY_ACKNOWLEDGE signal) or the second, third or fourth byte of a marked instruction (indicated by the select signals). A logic equation representing this implementation is:

```
READY_ACK = INSTRUCTION_READY_ACKNOWLEDGE +
    SELECT_in_i-1 + SELECT in i-2 +
    SELECT_in_i-3
```

Figure 6:
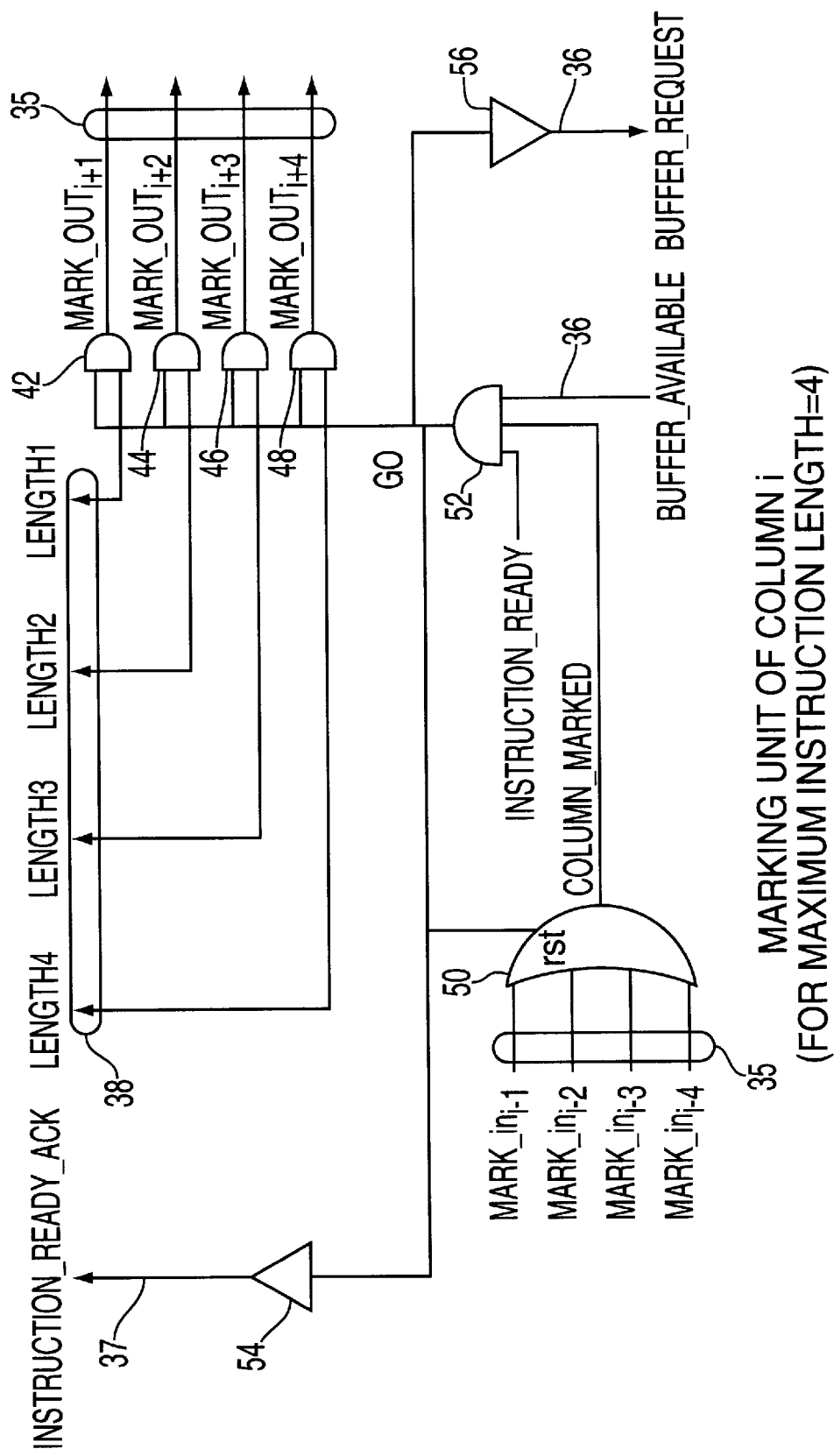
FIG. 6 is a block diagram of an embodiment of a marking unit according to the present invention.

FIG. 6 shows a circuit block diagram of an embodiment of marking unit 34 of column i of instruction marking circuit 20. The embodiment of marking unit 34 achieves the self-timed marking of columns in the instruction marking circuit. Those of skill in the art will recognize that other logic configurations (e.g. via handshaking) may be similarly used to achieve the desired marking effect.

In marking unit 34, each of the LENGTH1, LENGTH2, LENGTH3 and LENGTH4 signals (carried by signal lines 38) are provided at a first input of a respective AND gate 42, 44, 46, and 48. As previously noted, the length decoder 30 of column i signals the marking unit 34 via these length signal lines 38 to indicate the instruction length. A second input of each AND gate is provided a GO signal, which acts as a switching control. The outputs of AND gates 42, 44, 46, and 48 are coupled to the marking lines 35 to carry MARK_out_i+1, MARK_out_i+2, MARK_out_i+3, and MARK_out_i+4 signals, respectively. When the GO signal is asserted, the individual AND gate 42, 44, 46, or 48 which also has its first input (LENGTH1, LENGTH2, LENGTH3, LENGTH4) asserted will assert a marking signal at its output. Thus, the marking signal will be transmitted over one of the marking lines 35 directly to a downstream marking unit 34. For example, MARK_out_i+1 is transmitted to the marking unit 34 of column i+1 to mark this column as having the first byte of a new instruction.

Marking unit 34 also includes an OR gate 50 which receives as inputs a series of MARK_in signals carried by the marking lines 35. The MARK_in signals correspond to MARK_out signals received from upstream marking units 34. For example, a MARK_in_i-1 signal is a MARK_out_i+1 signal from the marking unit 34 of column i-1, a MARK_in_i-2 signal is a MARK_out_i+2 signal from the marking unit 34 of column i-2, and so forth. OR gate 50 thus receives as inputs any marking signals asserted by the upstream marking units 34.

OR gate 50 is configured to contain, for example, a state device at its output, such that assertion of either of the MARK_in_i-1, MARK_in_i-2, MARK_in_i-3 or MARK_in_i-4 signals causes the output of OR gate 50 to be held asserted until cleared by a reset signal. The output of OR gate 50, designated a COLUMN_MARKED signal, is connected to AND gate 52. AND gate 52 also has as inputs the BUFFER_AVAILABLE signal provided by the instruction steering circuit 22, and the INSTRUCTION_READY signal provided by the length decoder 30. The output of AND gate 52 is the GO signal, which is connected to the second inputs of AND gates 42, 44, 46, and 48 (as described above), to drivers 54 and 56, and to the reset input of OR gate 50. The output of driver 54, the INSTRUCTION_READY_ACKNOWLEDGE signal, is connected to the instruction ready acknowledge line for transmission to length decoder 30 of column i. The output of driver 56, the BUFFER_REQUEST signal, is connected to the buffer request line for transmission to instruction steering circuit 22.

The marking unit 34 as shown in FIG. 6, awaits assertion of three signals before asserting a marking signal—the COLUMN_MARKED signal, the INSTRUCTION_READY signal, and the BUFFER_AVAILABLE signal. The signals may be received in any order. When the marking circuit 34 is marked as a first byte of an instruction via assertion of one of the MARK_in signals at the inputs of OR gate 50, OR gate 50 asserts and holds asserted the COLUMN MARKED signal. When the bytes of the instruction are ready for transfer, the INSTRUCTION_READY signal is asserted by length decoder 30. When the instruction steering circuit 22 is ready to receive an instruction, it asserts the BUFFER_AVAILABLE signal. When the COLUMN_MARKED, INSTRUCTION_READY and BUFFER_AVAILABLE signals have each been asserted, the output of AND gate 52—the GO signal—is asserted.

Assertion of the GO signal causes several approximately simultaneous events to occur. The GO signal causes that AND gate 42, 44, 46, or 48 which also has its length input asserted to assert a marking signal (MARK_out_i+1, MARK_out_i+2, MARK_out_i+3, MARK_out_i+4) on the appropriate marking line 35. The GO signal also causes assertion of the BUFFER_REQUEST signal by the driver 56, directing the instruction steering circuit 22 to latch the instruction bytes from the byte latches 28. The GO signal also causes assertion of the INSTRUCTION_READY_ACKNOWLEDGE signal by the driver 54, informing the length decoder 30 that a transfer of the byte in the byte latch 28 is occurring, and thereby allowing the byte latch 28 to receive a new byte from the instruction line buffer 26.

Furthermore, the GO signal causes a reset of the state device of OR gate 50. The reset of OR gate 50 causes a deassertion of the COLUMN_MARKED signal at the output of OR gate 50 which, in turn, causes a deassertion of the GO signal at the output of AND gate 52. As a result, the INSTRUCTION_READY_ACKNOWLEDGE, BUFFER_REQUEST, and MARK_out signals are all deasserted. By arranging the circuitry of marking unit 34 in this manner, the outputs of the marking unit 34 are self-reset once the instruction data has been transmitted from byte latch 28 to the instruction steering circuit 22, and once the marking information has been sent to the downstream column.

Figure 7:
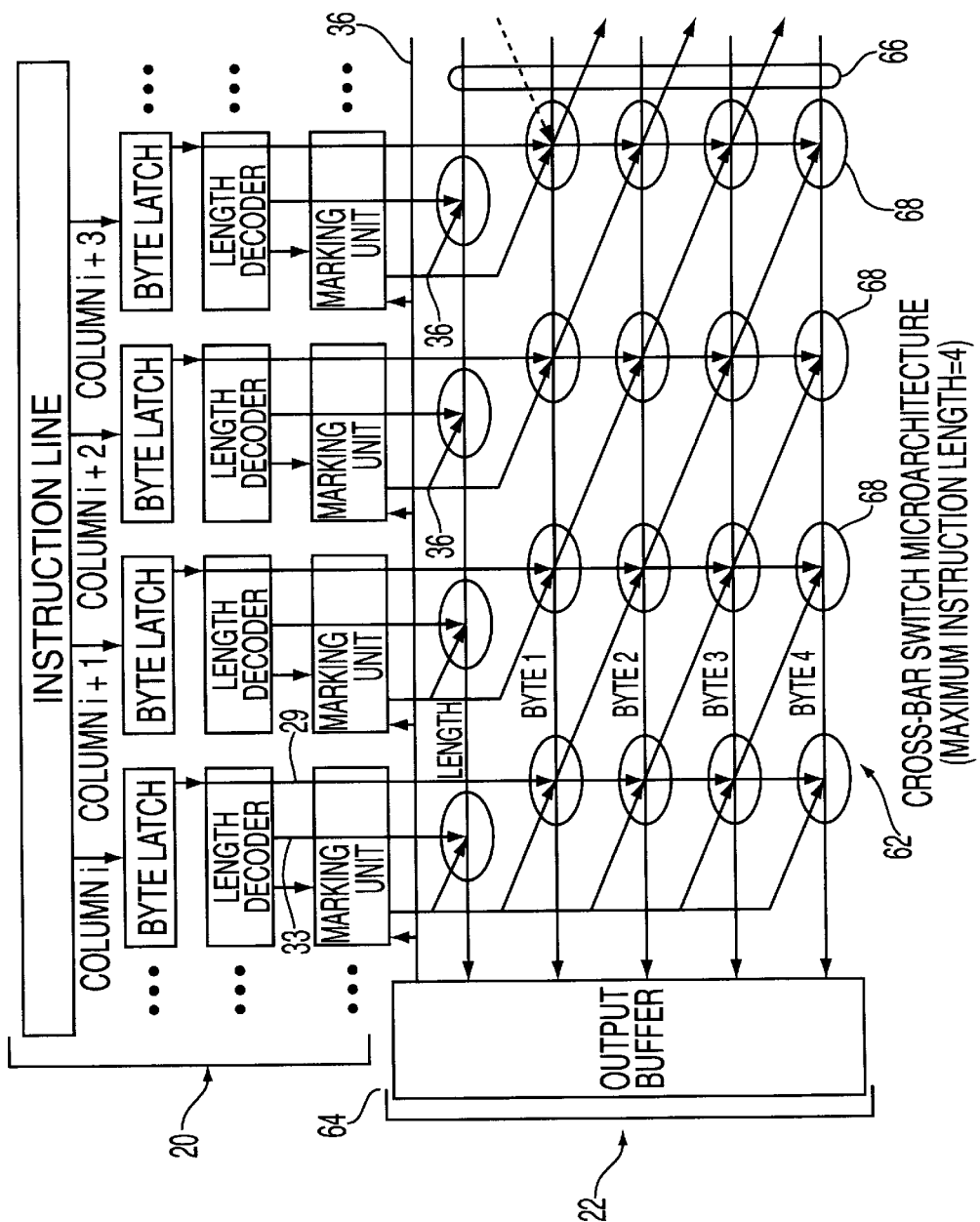
FIG. 7 is a block diagram of an embodiment of an instruction steering circuit in combination with an instruction marking circuit, according to the present invention.

FIG. 7 shows an embodiment of an instruction steering circuit 22, implemented in combination with instruction marking circuit 20. Instruction steering circuit 22 comprises a crossbar switch 62, output buffer 64, and output buffer data bus 66. Crossbar switch 62 itself comprises a plurality of switching elements 68 arranged according to the column of the instruction marking circuit 22. Each switching element 68 is coupled at a first set of inputs to one of the byte latches 28 via the byte latch output lines 29, or to one of the length decoders 30 via the length data lines 33, depending upon the location of switching element 68 in crossbar switch 62. Each switching element 68 is coupled at its outputs to the output buffer 64 via the lines of output buffer data bus 68. Each switching element 68 is further coupled at a second set of inputs to one of the marking units 34 via one of the BUFFER_REQUEST lines, configured such that the BUFFER_REQUEST signal will cause all bytes of a single instruction to be transmitted to the output buffer 64, as will be further explained below.

Figure 8:
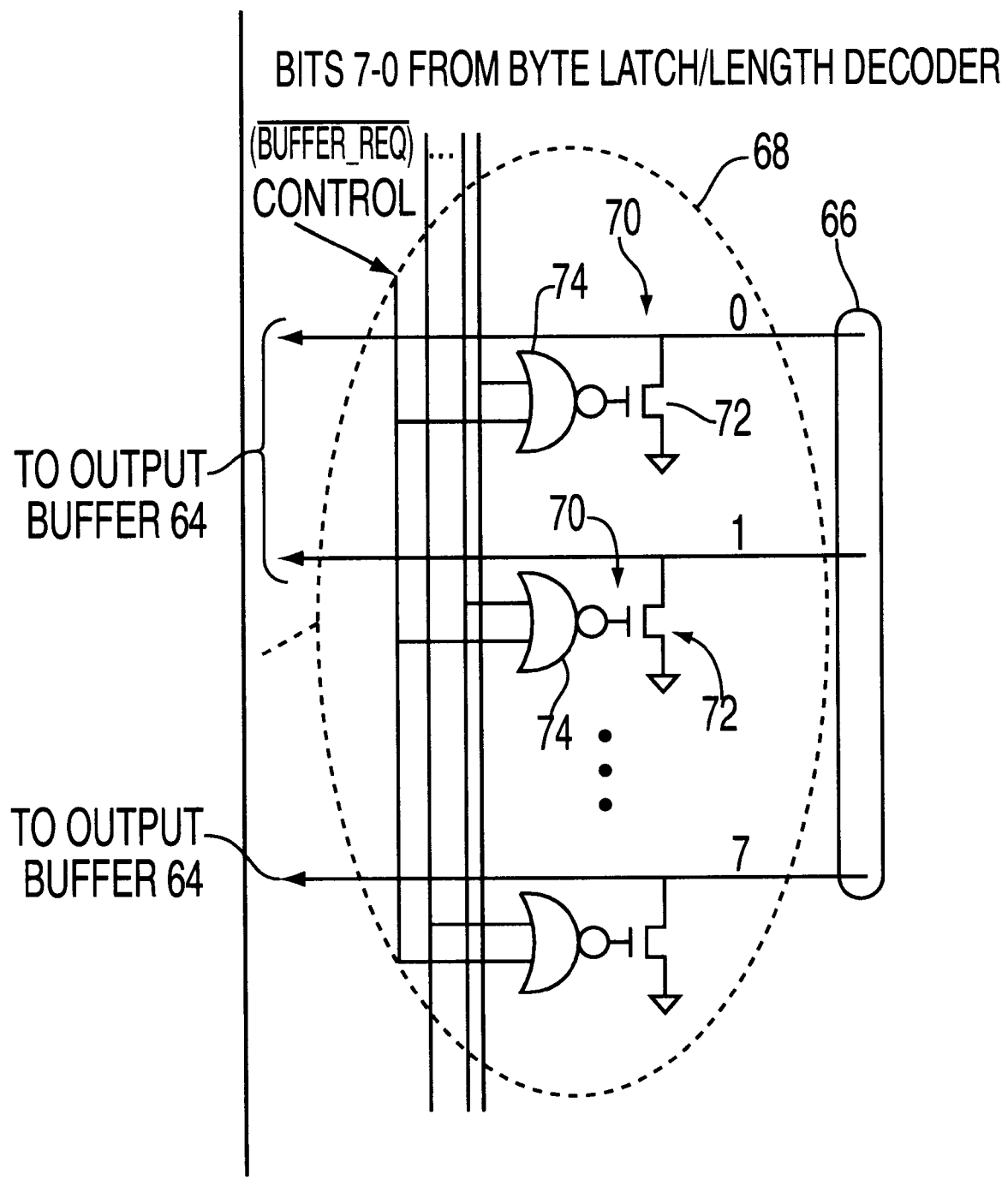
FIG. 8 is a circuit block diagram of an embodiment of a switching element of the crossbar switch shown in FIG. 7, according to the present invention.

Turning now briefly to FIG. 8, which shows an approximated circuit detail of an embodiment of a switching element 68, each switching element 68 comprises a number of digital switches 70 equal to the number of data lines being switched. Thus, for switching of the byte-sized data from the byte latches 28, eight digital switches 70 are used in the switching element 68. For the length data, which as implemented in the first embodiment of the present invention comprises four bits of data, each switching element 68 uses four digital switches 70. FIG. 8 shows a switching element 68 having 8 digital switches 70.

Each digital switch 70 includes a NOR gate 74 and a transistor 72, with the output of NOR gate 74 being coupled to the gate terminal of transistor 72. Each digital switch 70 within switching element 68 receives as an input one of the byte latch output lines 29 at a first terminal of NOR gate 74. Each digital switch 70 also receives as an input at NOR gate 74 a control signal, for example, an inverted BUFFER_REQUEST signal from the marking unit 34 of the appropriate column to control the switching element 68 (as further explained below). All digital switches 70 receive the inverted BUFFER_REQUEST signal from the same marking unit 34. The drain terminal of transistor 72 is coupled to the line of output buffer data bus 66 corresponding to the same bit position in the byte received as input to the digital switch 70. The source terminal of transistor 72 is connected to the logic low source. In this configuration, when the control (inverted BUFFER_REQUEST signal) is asserted, bit information from the byte latch 28 is reproduced on the lines of output buffer data bus 66 connected to digital switch 70, thus making the data available to output buffer 64 for reception.

Referring back now to FIG. 7, output buffer 64 is used to temporarily store instruction length and data bytes prior to transmission to the instruction decode circuit 24 (see FIG.

1). The output buffer 64 must therefore be configured so that the instruction decode circuit 24 can find the first byte of the instruction in the buffer and can receive length information for the instruction.

Figure 9:
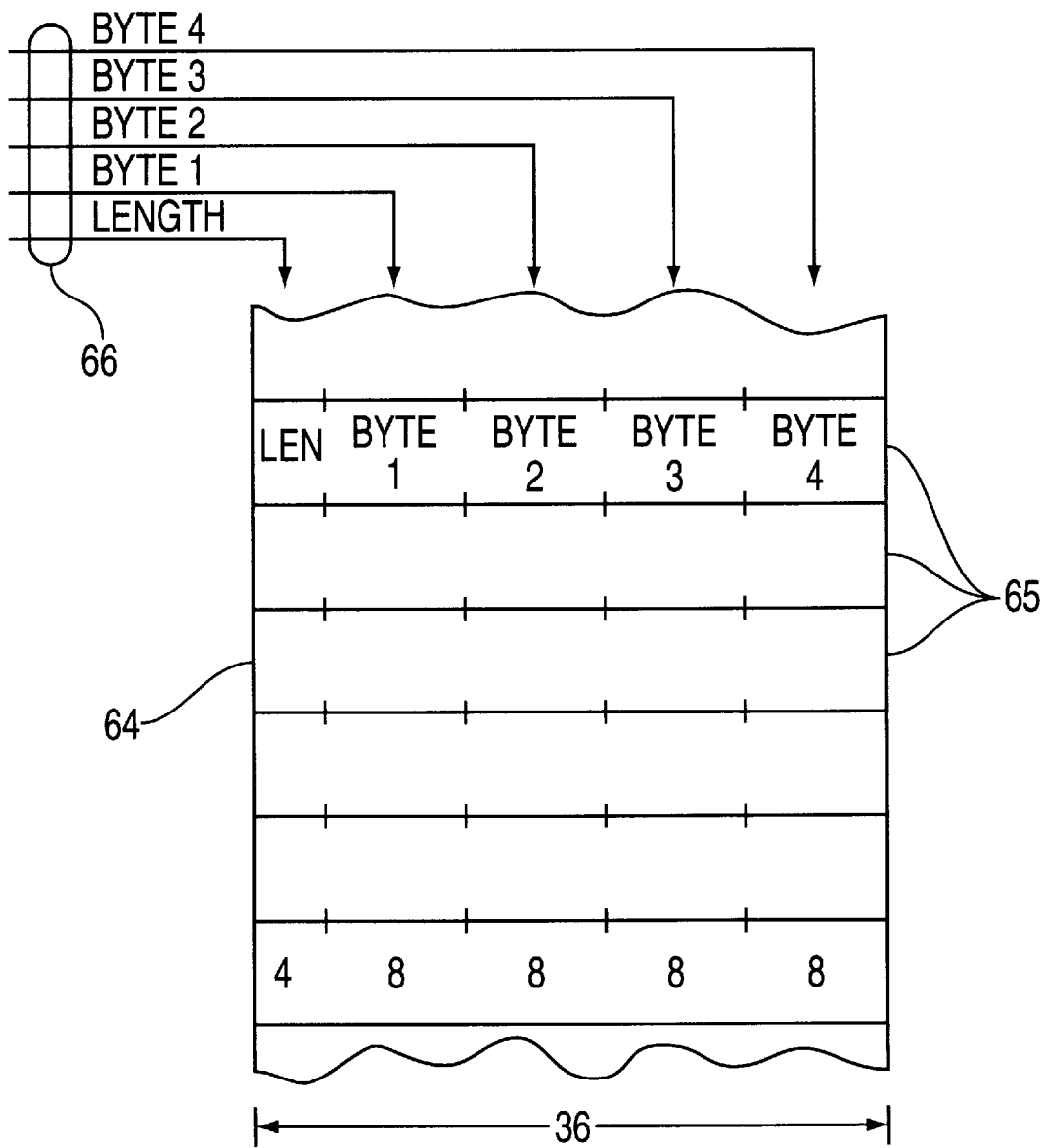
FIG. 9 is an embodiment of an output buffer according to the present invention.

Accordingly, an embodiment of an output buffer 64, as shown in FIG. 9, is configured as a series of buffer lines 65, each capable of holding a single full length instruction. The first bits of each buffer line 65 are the length data of the instruction, and the next bytes of the buffer line 65 are the instruction bytes, with the first byte of the instruction immediately following the length data. To accommodate the instructions decoded by the first embodiment of the present invention, each buffer line 65 of the output buffer 64 is 36 bits wide: 4 length bits plus 32 instruction bits (4 8-bit bytes).

Referring back now to FIG. 7, crossbar switch 62 is configured to transmit the appropriate instruction and length data to the output buffer 64 when a BUFFER_REQUEST signal is asserted by a marking unit 34. As shown in FIG. 7, each column of the instruction marking circuit 20 is associated with a set of switching elements 68 in the crossbar switch 62. The byte latch 28 for each column is coupled to the switching elements 68 associated with the same column. For example, as shown in FIG. 7, the byte latch 28 of column i is coupled (via the byte latch output lines 29) to the switching elements 68 whose outputs are connected to the lines of output buffer data bus 66 carrying instruction byte 1 (BYTE1), instruction byte 2 (BYTE2), instruction byte 3 (BYTE3), and instruction byte 4 (BYTE4), respectively. Accordingly, the length decoder 30 for each column is coupled (via the length data lines 33) to the switching element 68 associated with the same column and also connected to the lines of output buffer data bus 66 carrying the length data (LENGTH).

Transfer of the correct instruction bytes for a given instruction is achieved by the coupling arrangement of the BUFFER_REQUEST line of each column to the inputs of switching elements 68. In order to transfer the byte in the present column and the bytes in the subsequent columns to the output buffer 64 in the proper order, the BUFFER_REQUEST line originating from the marking unit 34 of the present column is connected to the switching elements 68 in the present column that switch the length data and BYTE1 data onto the output buffer data bus 66. That BUFFER_REQUEST line is further connected to the switching element 68 of each subsequent column corresponding to an incrementally increasing byte position. For example, as shown in FIG. 7, the BUFFER_REQUEST line originating from the marking unit 34 of column i is coupled: to the switching element 68 of column i that switches LENGTH data onto the output buffer data bus 66; to the switching element 68 of column i that switches BYTE1 data onto the output buffer data bus 66; to the switching element 68 of column i+1 that switches BYTE2 data onto the output buffer data bus 66; to the switching element 68 of column i+2 that switches BYTE3 data onto the output buffer data bus 66; and to the switching element 68 of column i+3 that switches BYTE4 data onto the output buffer data bus 66. This arrangement is replicated for every column of the crossbar switch 62, with the BUFFER_REQUEST line being "wrapped around" to the beginning of crossbar switch 62 for those columns at the end of crossbar switch 62, in the same manner as explained for the instruction marking circuit 20, above.

The result of this configuration is that when the BUFFER_REQUEST signal is asserted by the marking unit 34 of column i, the instruction bytes held in the byte latches 28 of columns i, i+1, i+2, and i+3, and the length data held in the length decoder 30, will be simultaneously transmitted to the output buffer 64 over the output buffer data bus 66 via the selected switching elements 68. Moreover, the length data will be stored as the first four bits of the buffer line 65, and the instruction bytes will be stored as the next four bytes of buffer line 65, in the proper order.

A transfer operation may be initiated by the output buffer 64 by asserting a BUFFER_AVAILABLE signal to all marking units 34 on the BUFFER_AVAILABLE line. The marking unit 34 that has been marked and is ready to transfer the instruction bytes to the output buffer 64 will then assert the BUFFER_REQUEST signal on its BUFFER_REQUEST line (according to the internal logic of the marking unit 34 as described above). The BUFFER_REQUEST signal causes the switching elements 68 connected to the BUFFER_REQUEST line for the marked column to transmit the length data and instruction bytes for the instruction from the byte latches 28 and length decoder 30 to the output buffer 64.

With this arrangement, the maximum number of bytes possible for an instruction will be loaded into the output buffer 64. Extraneous data may be loaded into the end byte locations of the buffer line 65 of output buffer 64 when the instruction being processed is less than the maximum number of bytes in length. However, since the length data is available to all subsequent processing circuits (e.g. the instruction decode circuit 24) as the first bits of each buffer line 65, these extraneous data bytes will be ignored.

With the implementation of the exemplary embodiment of the length decoder 30, marking unit 34, and instruction steering circuit 22 as described above, the first embodiment of the instruction decode block 14 according to the present invention can perform instruction length decoding, marking, and transmission asynchronously, dependent only upon the speed of propagation of the signals through the marking circuit and the speed of instruction fetching by the instruction decode circuit 24. As a result, no delay is incurred when an instruction having less than the maximum number of bytes is being processed by the instruction decode block 14.

Using the self-timed marking system causes an increase in the throughput of an instruction marking circuit. This increase in throughput may be lost, however, due to processing bottlenecks occurring in the instruction steering circuit. For example, it can take four times as long to transmit an instruction through the instruction steering circuit (i.e., sending instructions to the instruction steering circuit and receiving a signal that the instruction steering circuit is available for another instruction) than to mark an instruction. As a second embodiment of the present invention, an instruction decode block is implemented with self-timed length decoding and marking, and with multiple marking units and steering units to alleviate processing bottlenecks.

Figure 10:
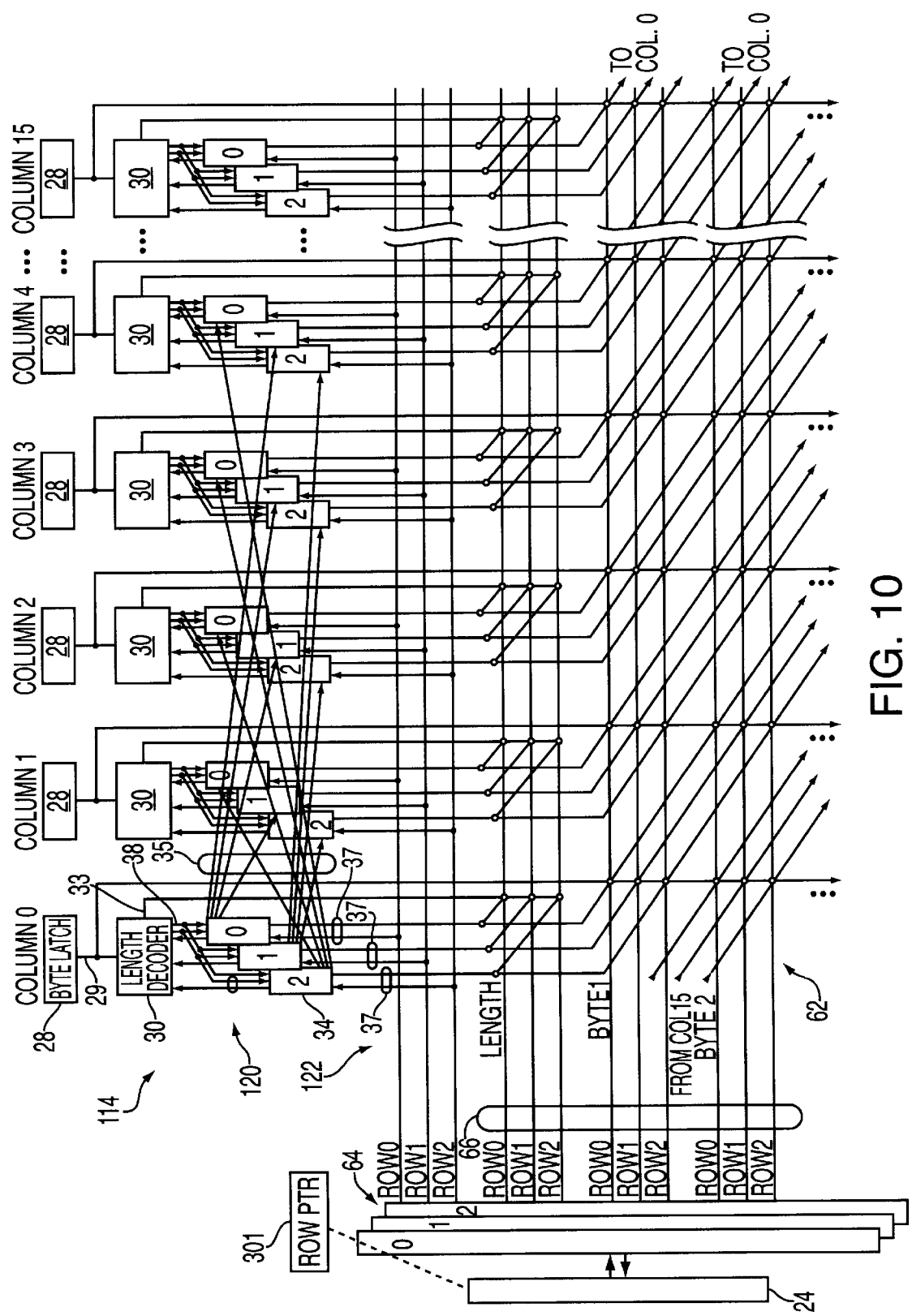
FIG. 10 is a block diagram of a second embodiment of an instruction decode block according to the present invention.

FIG. 10 shows a partial block diagram of the second embodiment of an instruction decode block 14 according to the present invention. An instruction marking circuit 120 and an instruction steering circuit 122 are implemented for a computer system using a sixteen byte wide instruction cache 10 and an instruction architecture having a maximum instruction length of four bytes (as was the case for the first embodiment of the present invention). Thus, instruction marking circuit 120 comprises sixteen columns (column 0—column 15). However, in this second embodiment of the present invention, instruction decode circuit 120 is implemented with multiple marking units 34 for each column of the circuit, and instruction steering circuit 22 is implemented with multiple crossbar switches 62 and output buffers 64.

As shown in FIG. 10, each column of instruction marking circuit 120 contains multiple marking units 34. For descriptive purposes, the multiple marking units 34 are designated by a row number, starting at zero. The number of marking units 34 used in each column can be determined by calculating the instruction throughput for the instruction marking circuit 120 and instruction steering circuit 122, i.e. the average time required to move instruction data to the output buffer divided by the average time required to mark an instruction. For the instruction marking circuit 120 shown in FIG. 10, three marking units 34 are used per column, and designated as the marking units 34 of rows 0, 1, and 2, respectively. Additional marking units 34 may be added to the instruction marking circuit 120, if desired, according to the principles described below.

The instruction steering circuit 122 is implemented to match the number of rows of marking units 34 used in instruction marking circuit 120. Thus, as shown in FIG. 10, three crossbar switches 62, three output buffer data buses 66, and three output buffers 64 are included in instruction steering circuit 122. The byte latches 28 of each column of instruction marking circuit 120 are connected to all of the crossbar switches 62, as shown in FIG. 7 for BYTE1 and BYTE2, in a manner similar to that described above for the first embodiment of the present invention. Likewise, the length data outputs of the length decoders 30 of each column of instruction marking circuit 20 are connected to all of the crossbar switches 62, as shown in FIG. 10, in a manner similar to that described above for the first embodiment. The instruction byte data in all byte latches 28 and the instruction length data in all length decoders 30 can thus be transmitted to any crossbar switch 62.

The length decoder handshaking lines 37 and length signal lines 38 are replicated across each marking unit 34 of each column in instruction marking circuit 120. Length decoders 30 may require additional OR gates to accommodate the multiple handshake signals coming from the multiple marking units 34, but the operation and implementation of the length decoders 30 of this second embodiment of the present invention is otherwise not different than that of the length decoders 30 of the first embodiment of the present invention.

The output buffer handshaking lines 36 for each marking unit 34 are only connected to the crossbar switch 62 and output buffer 64 having the same row number designation. For example, the buffer request line of the marking unit 34 designated as row 0 is connected only to the crossbar switch 62 designated as row 0, and is connected via the buffer available line only to the output buffer 64 designated as row 0. The crossbar switch 62 for a particular row is coupled to the respective output buffer 64 for the same row via the output buffer data bus 66 of that row. For example, the crossbar switch 62 designated as row 0 is connected to the output buffer 64 designated as row 0 via the output buffer data bus 66 designated as row 0.

Marking lines 35 are configured similarly to that of the first embodiment, however, the marking lines 35 are implemented to connect the marking unit 34 of a particular row to downstream marking units 34 of the next higher row designation. For example, as shown in FIG. 10, the marking unit 34 of row 0 column 0 is coupled via marking lines 35 to the marking units 34 of row 1 of columns 1–4. Those marking units 34 designated as the highest row level are coupled to the marking units of row 0. For example, as shown in FIG. 10, the marking unit 34 of row 2 column 0 is coupled to the marking units 34 of row 0 of columns 1–4. While FIG. 10 only shows the marking lines 35 originating at the marking units 34 of rows 0 and 2 of column 0, it should be understood that all other marking units 34 are coupled to upstream and downstream marking units 34 in the same manner.

The operation of the second embodiment of the present invention is as follows. Instruction bytes are latched into byte latches 28 from instruction line buffer 26 (not shown). Length decoding is performed in length decoder 30 of each column, generating length signals and handshaking signals (e.g. INSTRUCTION_READY). All marking units 34 in each column receive the length signals and handshaking signals generated by the respective length decoder 30.

Assuming, for purposes of this description, that column 0 contains the first byte of an instruction and that the previous marking unit was in row 2, the marking unit 34 of row 0 receives a marking signal indicating that column 0 has been marked as the first byte of an instruction. Once marking unit 34 of row 0 has also received the INSTRUCTION_READY signal from length decoder 30 and the BUFFER_AVAILABLE signal from output buffer 64 of row 0, the marking unit 34 of row 0 asserts the BUFFER_REQUEST signal, causing the length data in the length decoder 30 and the byte latches 28 of columns 0–3 to be transmitted to the output buffer 64 of row 0 via the crossbar switch 62 of row 0. The marking unit 34 of row 0 also asserts a marking signal on an appropriate marking line to directly mark the next column as containing the first byte of the next instruction. The marking signal is received by the marking unit 34 of row 1 of the marked column. The length decoding and marking process then repeats in the marked column, with the marking and steering now performed in row 1.

Instruction decode circuit 124 is designed to accommodate the multiple output buffers 64. For example, a row pointer 301 may be provided in instruction decode circuit 124 to point to the particular output buffer 64 to be accessed by the instruction decode circuit 124. Row pointer 301 is initially loaded to point to the output buffer 64 of row 0, since the length decoding and marking process described above begins by using row 0. The instruction decode circuit 124 fetches a length decoded instruction from the output buffer 64 pointed to by the row pointer 301. Once the fetch is complete, the row pointer 301 is incremented to point to the next row. The next length decoded instruction can then be fetched by instruction decode circuit 124 from the output buffer 64 of the next row. The row pointer 301 is incremented after each fetch until the maximum row designation is reached (which, in the second embodiment of the present invention, is row 2), and then the row pointer 301 is reset to point to row 0. The instruction marking circuit 120, instruction steering circuit 22 and instruction decode circuit 124 remain "synchronized," since the output buffer 64 that contains the next instruction is always one row designation higher than that of the output buffer 64 that contained the previous instruction.

Although the present invention has been described with respect to specific embodiments and examples, various changes and modifications may be suggested to one skilled in the art. For example, it may be undertaken to implement part or all of the present invention as hardware, microcode, programmable logic, and/or software. The present invention is intended to encompass these and other such changes and modifications as fall within the scope of the appended claims.

What is claimed is:

1. A circuit, comprising:
    a number of parallel processing units each having at least one input and at least one output, and
    a number of serial processing units each coupled to an associated parallel processing unit via the at least one output and each directly coupled to at least three other serial processing units;

wherein each parallel processing unit processes, in parallel, input data received via the at least one input; wherein each parallel processing unit generates output data based on the input data at the least one output; and wherein the output data of each parallel processing unit is valid if the serial processing unit associated with the parallel processing unit receives a marking signal from another serial processing unit.

2. The circuit of claim 1, wherein the number of parallel processing units are a number of length decoders and the number of serial processing units are a number of self-timed marking units.

3. An instruction marking circuit, comprising:

a plurality of length decoders, each of the length decoders having a length decoder input to receive a respective input byte and a length decoder output to transmit respective length data based on the input byte;

a plurality of marking units, each of the plurality of marking units coupled to a respective one of the plurality of length decoders to receive the respective length data;

wherein each of the plurality of marking units is coupled to at least one other marking unit in order to directly provide a marking signal to the at least one other marking unit.

4. The instruction marking circuit of claim 3, wherein each marking unit is a self-timed marking unit that generates a marking signal asynchronously.

5. The instruction marking circuit of claim 4, wherein each of the plurality of length decoders speculatively performs a decode of the respective input byte in parallel with at least one other length decoder, and wherein the respective length data of each length decoder is determined to be valid by receiving a marking signal in the respective marking unit.

6. The instruction marking circuit of claim 5, wherein the plurality of length decoders and the plurality of marking units are arranged as a plurality of columns, each one of the plurality of columns including at least one length decoder and at least one self-timed marking unit coupled to the at least one length decoder via the length decoder output and having at least two marking unit outputs and at least one marking unit input, wherein (a) the at least two marking unit outputs include a first marking output directly coupled to a first downstream self-timed marking unit of a first downstream column of the plurality of columns, and a second marking output directly coupled to a second downstream self-timed marking unit of a second downstream column of the plurality of columns, and (b) the at least one marking unit input includes a marking input directly coupled to an upstream self-timed marking unit of an upstream column of the plurality of columns.

7. The instruction marking circuit according to claim 6, wherein the first marking unit output and the second marking unit output are used to directly provide the marking signal to one of the first downstream marking unit and the second downstream marking unit.

8. The instruction marking circuit of claim 7, wherein each length decoder includes a number of length decoder outputs equal to a maximum number of bytes possible for an instruction and coupled to the respective self-timed marking unit to provide the respective length data.

9. The instruction marking circuit of claim 8, wherein the respective length data is provided as a "one-hot" signal via the number of length decoder outputs.

10. The instruction marking circuit of claim 7, wherein the at least one marking unit input includes a buffer available input coupled to a steering circuit to carry a buffer available signal.

11. The instruction marking circuit of claim 7, wherein the marking signal is a "one hot" signal.

12. The instruction marking circuit of claim 7, wherein the marking signal is a pulse.

13. The instruction marking circuit of claim 6, wherein the at least two marking outputs include a number of marking outputs equal to a maximum possible instruction length, and each of the at least two marking unit outputs is directly coupled to a downstream self-timed marking unit in a different downstream column of the plurality of columns.

14. The instruction marking circuit of claim 6, wherein each length decoder includes an instruction ready output coupled to the respective self-timed marking unit to carry an instruction ready signal.

15. The instruction marking circuit of claim 14, wherein each self-timed marking unit includes an instruction ready acknowledge output coupled to the respective length decoder to carry an instruction ready acknowledge signal.

16. The instruction marking circuit of claim 6, wherein the plurality of columns includes a front column and an end column, and wherein the first marking output of the self-timed marking unit of the end column is directly coupled via a wrap around connection to the marking input of the self-timed marking unit of the front column.

17. The instruction marking circuit of claim 5, further comprising a plurality of byte latches, wherein each of the plurality of byte latches is coupled to a respective length decoder to transmit the respective input byte.

18. The instruction marking circuit of claim 17, further comprising an instruction line buffer having a plurality of byte positions, wherein the instruction line buffer is coupled to each of the plurality of byte latches to provide an instruction byte stored in a respective byte position to the respective byte latch.

19. The instruction marking circuit of claim 18, wherein the instruction line buffer is a FIFO buffer.

20. The instruction marking circuit of claim 3, wherein the length decoder is implemented as a monotonic domino logic circuit.

21. The instruction marking circuit of claim 3, wherein the plurality of length decoders and the plurality of marking units are implemented in a microprocessor.

22. An instruction decoding block, comprising:

(1) an instruction marking circuit comprising a plurality of columns, each one of the plurality of columns including a byte latch to store a byte of instruction data, a length decoder having a length decoder input coupled to the byte latch to receive the byte and having a length output to provide length data, and a self-timed marking unit, coupled to the length decoder via the length output and having at least two marking unit outputs to provide a marking signal and at least one marking unit input to receive the marking signal, wherein (a) the at least two marking unit outputs include a first marking output directly coupled to a first downstream self-timed marking unit of a first downstream column of the plurality of columns, and a second marking output directly coupled to a second downstream self-timed marking unit of a second downstream column of the plurality of columns, and (b) the at least one marking unit input includes a marking input directly coupled to an upstream self-timed marking unit of an upstream column of the plurality of columns;

(2) an instruction steering circuit coupled to the instruction marking circuit to receive the instruction data; and (3) an instruction decode circuit coupled to the instruction steering circuit to receive the instruction data.

23. The instruction decode block of claim 22, wherein the instruction steering circuit comprises a crossbar switch coupled to the instruction marking circuit to receive the instruction data and an output buffer coupled to the crossbar switch to receive the instruction data, and wherein the instruction decode circuit is operatively coupled to the output buffer to receive the instruction data.

24. The instruction decode block of claim 23, wherein the crossbar switch and output buffer have a data width capable of carrying a maximum possible instruction length.

25. The instruction decode block of claim 24 wherein the instruction data includes at least one of instruction bytes and instruction length data, and wherein each byte latch is coupled to the crossbar switch to provide instruction bytes and each length decoder is coupled to the crossbar switch to provide instruction length data.

26. The instruction decode block of claim 22, wherein:

each of the plurality of columns of the instruction marking circuit includes a first self-timed marking unit and a second self-timed marking unit, wherein both the first and second self-timed marking units are coupled to the length decoder to receive length data; and the instruction steering circuit includes a first crossbar switch and a second crossbar switch, wherein both the first and second crossbar switches are coupled to the byte latch of each of the plurality of columns and the length decoder of each of the plurality of columns, and a first output buffer coupled to the first crossbar switch to receive instruction data and a second output buffer coupled to the second crossbar switch to receive instruction data.

27. The instruction decode block of claim 26, wherein the first marking unit output of the first self-timed marking unit of each column is coupled to the marking input of the second self-timed marking unit of the first downstream column, and the second marking unit output of the first self-timed marking unit of each column is coupled to the marking input of the second self-timed marking unit of the second downstream column.

28. A method for processing information, comprising the steps of:

receiving a plurality of data;

directly processing each datum of the plurality of data in parallel to obtain a plurality of results;

directly providing a first serial signal to indicate a first valid result of the plurality of results; and providing a second serial signal to indicate a second valid result of the plurality of results;

wherein the second serial signal is based on the first valid result, and the second serial signal is provided after the first serial signal is provided.

29. A method for marking variable-length instructions, comprising the steps of:

receiving a first instruction byte in a present column of an instruction marking circuit;

receiving a second instruction byte in a downstream column of the instruction marking circuit;

length decoding the first instruction byte and second instruction byte in parallel to produce a first length signal representing a length of a present instruction and to produce a second length signal representing a length of a next instruction;

determining whether the downstream column contains a first byte of the next instruction, based on the first length signal;

providing a second marking signal to the downstream column to indicate that the second length signal is valid when a first marking signal is received in the present column to indicate that the first length signal is valid, and when the downstream column contains the first byte of the next instruction.

30. The method according to claim 29, wherein the first marking signal is received from an upstream column of the instruction marking circuit, and wherein the second marking signal is only provided to the downstream column after the first marking signal has been received.

31. The method according to claim 30, further comprising the step of receiving an instruction ready signal, and wherein the second marking signal is only provided to the downstream column after the instruction ready signal has been received.

32. The method according to claim 31, further comprising the step of receiving a buffer available signal, and wherein the second marking signal is only provided to the downstream column after the buffer available signal has been received.

33. The method according to claim 32, further comprising the steps of:

loading an instruction line buffer with an instruction line comprising a plurality of instruction bytes, including the first instruction byte and the second instruction byte;

loading the first instruction byte into a byte latch in the present column;

providing a ready signal when the first instruction byte is properly loaded into the byte latch; and performing the length decoding of the first instruction byte when the ready signal has been provided.

34. The method according to claim 33, further comprising the steps of:

providing an instruction ready signal when the first instruction byte is properly loaded into the byte latch, and all additional bytes of the present instruction are properly loaded into respective byte latches; and providing a buffer available signal when a steering circuit is available to receive instruction bytes.

35. The method according to claim 34, further comprising the step of:

latching the first instruction byte and all additional bytes of the present instruction to the steering circuit when the second marking signal is provided.

36. The method according to claim 29, wherein the length decoding step is performed in a plurality of length decoders, each length decoder corresponding to a column of the instruction marking circuit.

37. The method according to claim 33, further comprising the step of resetting the length decoder of the present column after providing the second marking signal to the downstream column.

* * * * *

UNITED STATES PATENT AND TRADEMARK OFFICE
CERTIFICATE OF CORRECTION

PATENT NO. : 5,978,899
DATED : November 2, 1999
INVENTOR(S) : Ginosar et al.

It is certified that error appears in the above-identified patent and that said Letters Patent is hereby corrected as shown below:

Column 21,
Line 52, "directly processing each datum" should be -- processing each datum --.
Line 56, "providing a second" should be -- directly providing a second --.

Signed and Sealed this

Ninth Day of October, 2001

*Attest:*

NICHOLAS P. GODICI
*Attesting Officer*   Acting Director of the United States Patent and Trademark Office